United States Patent
Kim et al.

(10) Patent No.: US 8,924,462 B2
(45) Date of Patent: Dec. 30, 2014

(54) APPARATUS FOR CONTROLLING SERVICE OF NETWORK ROBOT SYSTEM BASED ON REMOTE PROCEDURE CALLS AND METHOD THEREOF

(75) Inventors: Kun Ouk Kim, Daejeon (KR); Kang Woo Lee, Daejeon (KR); Young Ho Suh, Gwangju (KR)

(73) Assignee: Intellectual Discovery Co., Ltd., Seoul (KR)

( * ) Notice: Subject to any disclaimer, the term of this patent is extended or adjusted under 35 U.S.C. 154(b) by 391 days.

(21) Appl. No.: 13/307,333

(22) Filed: Nov. 30, 2011

(65) Prior Publication Data

US 2012/0143941 A1    Jun. 7, 2012

(30) Foreign Application Priority Data

Dec. 1, 2010    (KR) ........................ 10-2010-0121504

(51) Int. Cl.
*G06F 15/16* (2006.01)
*G06F 9/48* (2006.01)
(52) U.S. Cl.
CPC ................................... *G06F 9/4881* (2013.01)
USPC ......................................... 709/202; 700/245
(58) Field of Classification Search
USPC ......................................... 709/202; 700/245
See application file for complete search history.

(56) References Cited

U.S. PATENT DOCUMENTS

| | | | | |
|---|---|---|---|---|
| 7,113,848 | B2 * | 9/2006 | Hanson ......................... | 700/245 |
| 8,032,886 | B2 * | 10/2011 | Joy et al. ...................... | 718/102 |
| 8,103,382 | B2 * | 1/2012 | Root et al. .................... | 700/248 |
| 2002/0173879 | A1 * | 11/2002 | Sakamoto et al. ............ | 700/245 |
| 2003/0023347 | A1 * | 1/2003 | Konno et al. ................. | 700/245 |
| 2003/0114959 | A1 * | 6/2003 | Sakamoto et al. ............ | 700/245 |
| 2008/0098065 | A1 * | 4/2008 | Lee et al. ...................... | 709/203 |
| 2009/0319598 | A1 * | 12/2009 | Mittel et al. .................. | 709/202 |

* cited by examiner

*Primary Examiner* — Thomas Dailey
(74) *Attorney, Agent, or Firm* — Rabin & Berdo, P.C.

(57) ABSTRACT

Disclosed are an apparatus for controlling a service of a network robot system based on remote procedure calls and a method thereof. The apparatus for controlling services of a network robot system according to an exemplary embodiment of the present invention includes: a terminal agent calling an asynchronous procedure of the robot services to acquire asynchronous operation objects and performing asynchronous operations on the asynchronous operation objects according to previously established scheduling policies, when receiving an execution of robot services from a service server through a network; and a plurality of drivers executing the robot services according to the asynchronous operations of the terminal agent. By this configuration, the exemplary embodiment of the present invention can avoid resource collision due to resource approach at a plurality of robot services, improve the simultaneity of the robot services, and implement operation applications for high performance control.

14 Claims, 6 Drawing Sheets

FIG. 3

```
<?xml version + "1.0" encoding = "EUC-KR"?>
<service_description>
  <scheduler id = "wheel" default_policy = "queued"/>
  <using scheduler = "wheel">
    <service id= "wheel" name = "uron 바퀴 제어" type = "camus.service.robot.MoveWheel">
      <component class = "UronMoveWheel" bundle = "uron.p3dx"  extension = "uron_p3dx-vc9.dll">
        <property name = "robot">
          <reference>
            <local>robot</local>
          </reference>
        </property>
      </component>
    </service>
  </using>
```

FIG. 4

```
SchedulingPolicy get SchedulePolicy();
void set SchedulePolicy(SchedulingPolicy policy );

enum SchedulingPolicy
{
        QUEUD, CANCLE_PREVIOUS, NO_WAIT
};
```

ConcurrentAsyncOperation(Executor* executor, std::vector<AsyncOperation* >* elements);
SequentialAsyncOperation(Executor* executor, std::vector<AsyncOperation* >* elements);
DelayedAsyncOperation(AsyncOperation* aop, long delay, ScheduledExecutorService*executor);

APPARATUS FOR CONTROLLING SERVICE OF NETWORK ROBOT SYSTEM BASED ON REMOTE PROCEDURE CALLS AND METHOD THEREOF

CROSS-REFERENCE TO RELATED APPLICATIONS

This application claims priority to and the benefit of Korean Patent Application No. 10-2010-0121504 filed in the Korean Intellectual Property Office on Dec. 1, 2010, the entire contents of which are incorporated herein by reference.

TECHNICAL FIELD

The present invention relates to a network robot system, and more particularly, to an apparatus for controlling a service of a network robot system based on remote procedure calls and a method thereof capable of previously establishing a plurality of scheduling policies to allow a scheduler to variably apply other scheduling policies according to resources in order to process requested robot services or grouping at least one asynchronous operation into single asynchronous operation to perform at least one asynchronous operation in the group in sequence or in parallel.

BACKGROUND

Recently, with the rapid propagation and distribution of smart apparatuses and the expansion of network infrastructure, a robot system has been developed from a stand-alone type in the past to a network-based type capable of maximize the use of resources in a Ubiquitous environment.

The network robot system, which is an Ubiquitous robot converging a robot and a system to provide various services to a user anytime or anywhere, implies a system that supports cooperation between heterogeneous robots by providing a function of controlling a plurality of robots while reducing costs by minimizing components mounted in a robot, provides high performance robot services by connecting with a backend server, and includes a context aware module to allow a robot to be aware of surrounding environments in order to provide the best services under each surrounding environment.

Real-time, stability, and reliability are indispensible to the network-based robot control system. In addition, the network-based robot control system provides various functions to precisely control a robot while considering extensibility. In order to satisfy these conditions, a plurality of network robot systems, which are recently being researched and developed, have employed a remote procedure calls (RPC) scheme.

The remote procedure calls scheme used to control a robot is executed in a synchronous scheme or an asynchronous scheme. Generally, simple works done in a short time such as reading values or acquiring status values from sensors, or the like, are executed in a synchronous procedure calls scheme, while works done in a relatively long time such as a movement of a robot, a control of operation parts of a head/an arm of a robot, or the like, or an interaction with a user are executed in an asynchronous procedure calls scheme.

In particular, the asynchronous procedure calls scheme implies a remote procedure calls scheme that hands over control objects capable of controlling the operation execution when calling a remote procedure and returning results of the operation when the operation ends.

In order for a robot to provide higher performance services, various services should be processed simultaneously, which are achieved by a plurality of asynchronous operation manners at any time. To this end, there is a need for a method for appropriately processing at least one asynchronous operation. Further, there is a need to solve a collision problem of a control right for a robot apparatus and environment resources that are caused due to the parallel execution of the plurality of asynchronous operations.

SUMMARY

The present invention has been made in effort to provide an apparatus for controlling a service of a network robot system based on remote procedure calls and a method thereof capable of previously establishing a plurality of scheduling policies to allow a scheduler to variably apply other scheduling policies according to resources in order to process requested robot services.

Further, the present invention has been made in effort to provide an apparatus for controlling a service of a network robot system based on remote procedure calls and a method thereof capable of grouping at least one asynchronous operation into a single asynchronous operation to perform at least one asynchronous operation in the group in sequence or in parallel.

An exemplary embodiment of the present invention provides an apparatus for controlling services of a network robot system, including: a terminal agent calling an asynchronous procedure of the robot services to acquire asynchronous operation objects and performing asynchronous operations on the asynchronous operation objects according to previously established scheduling policies, when receiving an execution of robot services from a service server through a network; and a plurality of drivers executing the robot services according to the asynchronous operations of the terminal agent.

The scheduling policy may include a first scheduling policy sequentially performing the asynchronous operations on the asynchronous operation objects, a second scheduling policy independently executing the asynchronous operations on the asynchronous operation objects in other resources, and a third scheduling policy forcibly ending the asynchronous operations for all the already executed asynchronous operation objects and performing the asynchronous operations on newly requested asynchronous operation objects.

The terminal agent may put the asynchronous operation objects in a queue according to the first scheduling policy, perform the asynchronous operations on the first entered asynchronous operation objects in a thread pool, and then, sequentially perform the asynchronous operations on the next asynchronous operation objects.

The terminal agent may immediately put the asynchronous operation objects in the thread pool according to the selection of the second scheduling policy to perform the asynchronous operations on the asynchronous operation objects in each of the plurality of threads in parallel.

The terminal agent may end the execution of the asynchronous operations on all the existing asynchronous operation objects processed in the thread pool according to the selection of the third scheduling policy and put the newly requested asynchronous operation objects in the thread pool to perform the asynchronous operations on the newly requested asynchronous operation objects.

Another exemplary embodiment of the present invention provides an apparatus for controlling services of a network robot system, including: a terminal agent calling an asynchronous procedure of the robot services to acquire asynchronous operation objects when receiving the execution of robot services from a service server through a network and grouping at least one asynchronous operation object into a single asynchronous operation object group to perform the asynchronous operations on the asynchronous operation objects within the asynchronous operation object group; and a plurality of drivers executing the robot services according to the asynchronous operations of the terminal agent.

The terminal agent may put the asynchronous operation objects in a queue, perform the asynchronous operations on the first entered asynchronous operation objects in a thread pool, and then, sequentially perform the asynchronous operations on the next asynchronous operation objects.

The terminal agent may immediately put the asynchronous operation objects in the thread pool to perform the asynchronous operations on the asynchronous operation objects within the asynchronous operation object group in each of the plurality of threads in parallel.

Yet another exemplary embodiment of the present invention provides a method for controlling services of a network robot system, including: calling an asynchronous procedure of the robot services to acquire asynchronous operation objects when receiving the execution of robot services from a service server through a network; executing the asynchronous operations on the asynchronous operation objects according to a previously established scheduling policy; and executing the robot services through a plurality of drivers according to the asynchronous operations.

The scheduling policy may include a first scheduling policy sequentially performing the asynchronous operations on the asynchronous operation objects, a second scheduling policy independently executing the asynchronous operations on the asynchronous operation objects in other resources, and a third scheduling policy forcibly ending the asynchronous operations for all the already executed asynchronous operation objects and performing the asynchronous operations on newly requested asynchronous operation objects.

The executing of the asynchronous operation may put the asynchronous operation objects in a queue according to the first scheduling policy, perform the asynchronous operations on the first entered asynchronous operation objects in a thread pool, and then, sequentially perform the asynchronous operations on the asynchronous operation objects.

The performing of the asynchronous operation may immediately put the asynchronous operation objects in the thread pool according to the selection of the second scheduling policy to perform the asynchronous operations on the asynchronous operation objects in each of the plurality of threads in parallel.

The executing of the asynchronous operation may end the execution of the asynchronous operations on all the existing asynchronous operation objects processed in the thread pool according to the selection of the third scheduling policy and put the newly requested asynchronous operation objects in the thread pool to perform the asynchronous operations on the newly requested asynchronous operation objects.

Still another exemplary embodiment of the present invention provides a method for controlling services of a network robot system, including: calling an asynchronous procedure of the robot services to acquire asynchronous operation objects when receiving the execution of robot services from a service server through a network; grouping at least one asynchronous operation object into a single asynchronous operation object group to perform the asynchronous operations on the asynchronous operation objects within the asynchronous operation object group; and executing the robot services according to the asynchronous operations through a plurality of drivers.

The performing of the asynchronous operation may put the asynchronous operation objects in a queue, perform the asynchronous operations on the first entered asynchronous operation objects in a thread pool, and then, sequentially perform the asynchronous operations on the next asynchronous operation objects.

The performing of the asynchronous operation may immediately put the asynchronous operation objects in the thread pool to perform the asynchronous operations on the asynchronous operation objects within the asynchronous operation object group in each of the plurality of threads in parallel.

As set forth above, the exemplary embodiment of the present invention previously establishes the plurality of scheduling policies to allow the scheduler to variably apply other scheduling policies according to resources in order to process the requested robot services, thereby avoiding the resource collision due to the resource approach in the plurality of robot services.

Further, the exemplary embodiment of the present invention groups at least one asynchronous operation into single asynchronous operation to perform at least one asynchronous operation in the group in sequence or in parallel, thereby improving the simultaneity of the robot services.

In addition, the exemplary embodiment of the present invention groups at least one asynchronous operation into single asynchronous operation to perform at least one asynchronous operation in the group in sequence or in parallel, thereby executing the operation applications for the high performance control.

BRIEF DESCRIPTION OF THE DRAWINGS

FIG. 3 is an exemplified diagram showing a program source establishing scheduling policies according to an exemplary embodiment of the present invention;

FIG. 4 is an exemplified diagram showing a program source of remote procedure calls according to an exemplary embodiment of the present invention;

DETAILED DESCRIPTION

Figure 1:
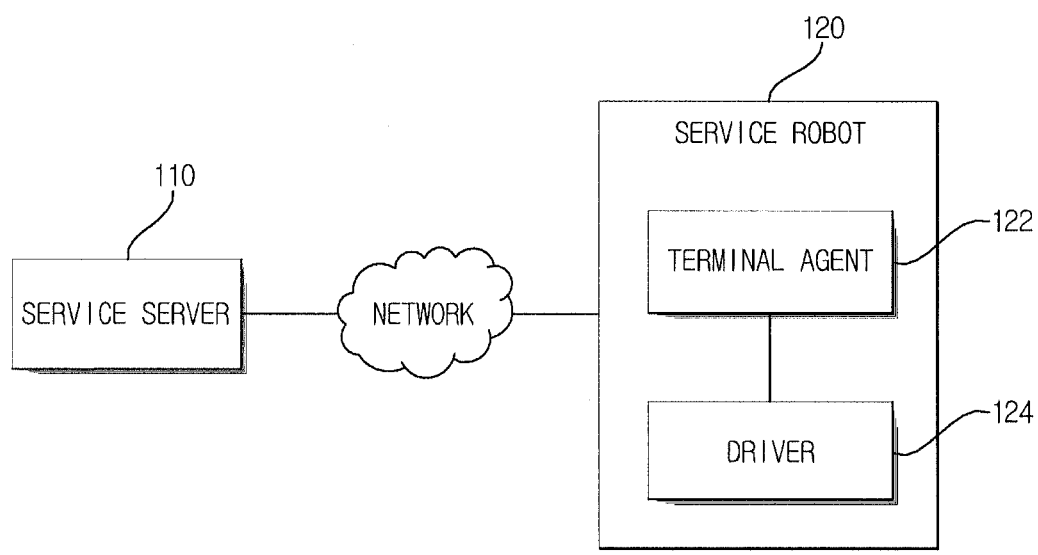
FIG. 1 is an exemplified diagram schematically showing a network robot system according to an exemplary embodiment of the present invention.

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

Hereinafter, a apparatus for controlling robot services and a method thereof in of a network robot system based on remote procedure calls according to an exemplary embodiment of the present invention will be described with reference to FIGS. 1 to 8.

As a scheme for processing robot services according to the present invention, there is a scheme of 1) previously establishing a plurality of scheduling policies to allow a scheduler to variably apply other scheduling policies according to resources in order to process requested robot services, or 2) grouping at least one asynchronous operation into single asynchronous operation to perform at least one asynchronous operation in the group in sequence or in parallel.

FIG. 1 is an exemplified diagram schematically showing a network robot system according to an exemplary embodiment of the present invention.

As shown in FIG. 1, a network robot system according to the exemplary embodiment of the present invention, which is implemented in an asynchronous procedure calls scheme, may be configured to include a service server 110, a plurality of service robots 120, or the like.

The service server 110 may receive various pieces of information for a terminal agent 122 and register them, and then, request various kinds of robot services to the terminal agent 122 according to the request of the user.

Each of the service robots 120 may be configured to include a terminal agent 122 and a plurality of drivers 124 in order to execute the corresponding robot services according to the robot service request of the service server 110.

The terminal agent 122 receives various kinds of robot services from the service server through a network to execute scheduling and operation synthesis for requested robot services. In particular, the terminal agent 122 according to the exemplary embodiment executes 1) a scheduling function of processing the robot services by applying any one of a plurality of previously established scheduling policies according to the robot services and 2) an operation synthesis function of grouping at least one asynchronous operation into single asynchronous operation to perform at least one asynchronous operation in the group in sequence or in parallel.

The functions of the terminal agent 122 will be described below.

The driver 124 is connected to the terminal agent 122 to execute the robot services according to control instructions. A unit for executing the robot services may be a robot arm, moving units, sensors, voice output units, image output units, or the like.

Hereinafter, the scheduling function will be described.

The exemplary embodiment of the present invention should avoid collision between apparatuses using the robot services or resources. That is, one robot service is used by acquiring a control right of resources through a thread by calling a procedure executing asynchronous operation. In this case, when the control rights are acquired from other threads, the collision occur.

For example, TTS. Speak of the robot services providing a text to speech (TTS) function, the asynchronous procedure calls are simultaneously executed. As a result, when at least one thread processes the asynchronous procedure calls, voice may be not properly output and errors may occur during a process of acquiring resources.

As another example, when controlling wheels, if a request to rotate a motor forward (in case of forward movement) from one side and a request to rotate a motor backward (in case of backward movement) from the other side are input, any problem in service execution is caused.

In order to avoid the problem of the resource collisions, the present invention proposes a scheme to solve the problem by establishing three policies and scheduling policies meeting resource characteristics.

Figure 2:
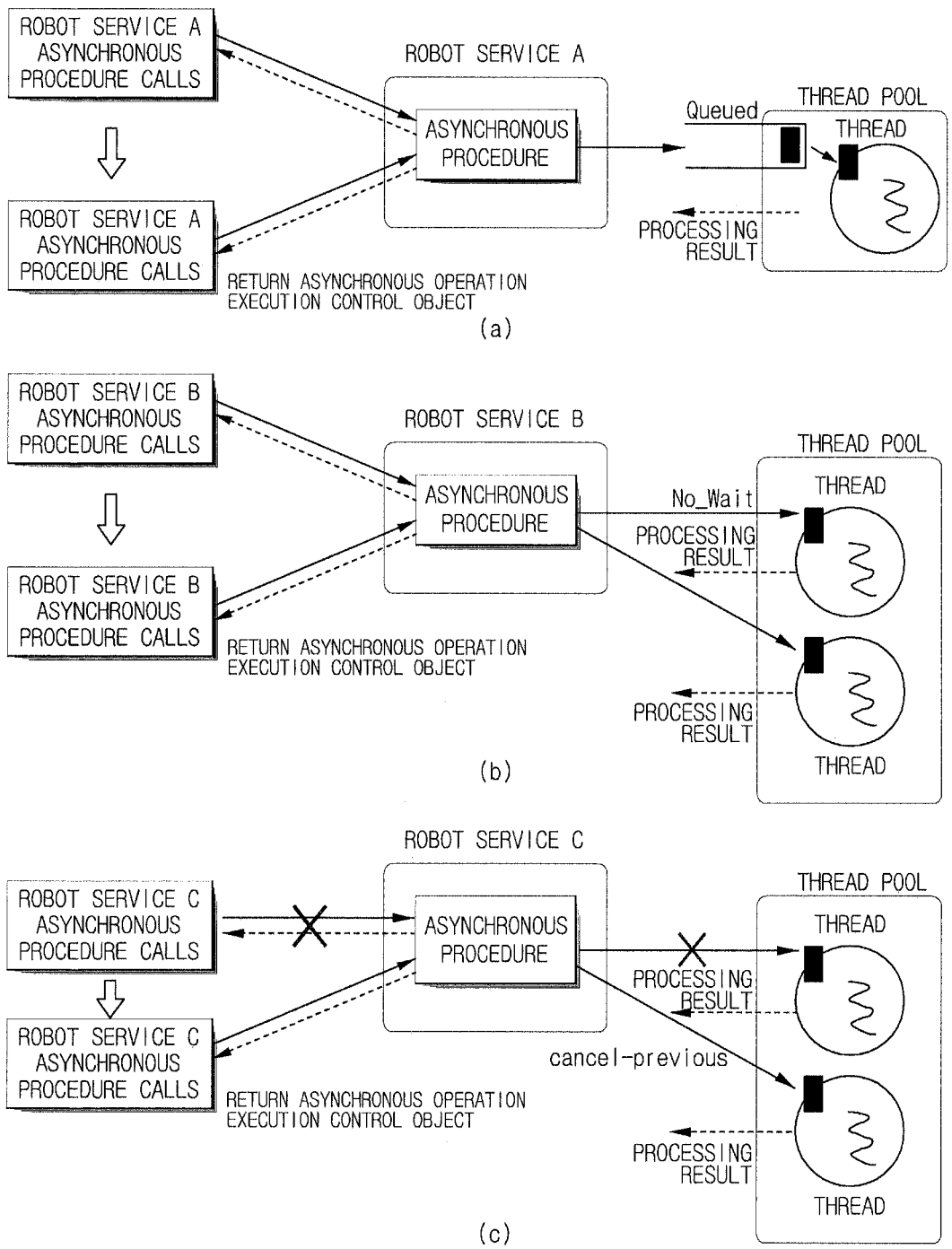
FIG. 2 is an exemplified diagram for explaining an operational principle of a scheduling function according to an exemplary embodiment of the present invention.

FIG. 2 is an exemplified diagram for explaining an operational principle of a scheduling function according to an exemplary embodiment of the present invention.

As shown in FIG. 2, whenever tasks are generated, the terminal agent 122 according to the exemplary embodiment of the present invention previously establishes 1) a first scheduling policy processing the tasks in an entry order into a queue, 2) a second scheduling policy independently processing the tasks in other resources, 3) a third scheduling policy forcibly ending all of the already executed tasks and executing newly requested tasks, or the like, and selectively applies these policies.

In this case, the exemplary embodiment of the present invention previously establishes and applies three scheduling policies, but is not necessarily limited thereto, and therefore, may establish and apply various scheduling policies as necessary.

1) The terminal agent 122 processes the tasks in an entry sequence into the queue according to the first scheduling policy whenever the tasks are generated.

For example, shown in FIG. 2A, when the terminal agent 122 receives two robot services A from the service server, it calls the asynchronous procedure of robot service A to acquire the asynchronous operation objects.

When the terminal agent 122 cannot simultaneously approach resources used in order to provide the robot service A, it puts two asynchronous operation objects in the queue and performs the asynchronous operation on the first entered synchronous operation objects in the thread pool and then, perform the asynchronous operations on the next asynchronous operation objects. That is, the asynchronous operations on two asynchronous objects are sequentially executed in the thread pool by using one thread.

The terminal agent 122 returns the control objects capable of confirming or controlling the asynchronous operation execution state for the asynchronous operation objects in the thread pool That is, unlike the existing synchronous procedure, the called asynchronous procedure immediately transfers results according to the asynchronous operation execution request without waiting until the result values of the procedure after the procedure is called are calculated and returned.

2) The terminal agent 122 independently processes the tasks in the other resources according to the second scheduling policy whenever the tasks are generated.

For example, shown in FIG. 2B, when the terminal agent 122 receives two robot services B from the service server, it calls the asynchronous procedure of robot service B to acquire the asynchronous operation objects.

The terminal agent 122 immediately puts two asynchronous operation objects in the thread pool to perform the asynchronous operations in parallel. That is, the asynchronous operations on two asynchronous objects are individually executed in the thread pool by using two threads.

When the asynchronous operation execution ends, the terminal agent 122 returns the control objects capable of confirming or controlling the asynchronous operation execution state for the asynchronous operation objects in the thread pool.

3) Whenever the tasks are generated, the terminal agent 122 forcibly ends all the already executed tasks according to the third scheduling policy and processes the newly requested tasks.

For example, as shown in FIG. 2C, when the terminal agent 122 receives new robot service C during the execution of two tasks for the robot by receiving two robot services A from the service server, it forcibly ends the two tasks for the existing robot service A and calls the robot service C, thereby acquiring the asynchronous operation objects.

The terminal agent 122 puts the asynchronous operation objects in the queue and performs the asynchronous operation for the asynchronous operation objects in the thread pool.

When the asynchronous operation execution ends, the terminal agent 122 returns the control objects capable of confirming or controlling the asynchronous operation execution state for the asynchronous operation objects in the thread pool.

FIG. 3 is an exemplified diagram showing a program source establishing scheduling policies according to an exemplary embodiment of the present invention.

FIG. 3 shows the case where the scheduling policy according to the exemplary embodiment of the present invention is established. In FIG. 3, an attribute, id and an attribute, default_policy are established in an element, a scheduler.

Briefly describing this, one of the first scheduling policy, "queued", the second scheduling policy, "no_wait", and the third scheduling policy, "cancel_previous" are established in the default_policy and impart an appropriate value to the id. Next, the desired scheduling policy may be applied by handing over an id value to a using scheduler attribute.

When the scheduling policy is established, the terminal client 122 processes the corresponding robot services according to the established scheduling policies.

FIG. 4 is an exemplified diagram showing a program source of remote procedure calls according to an exemplary embodiment of the present invention.

FIG. 4 shows the remote procedure calls according to the exemplary embodiment of the present invention. Other scheduling policies may be dynamically applied by calling the remote procedure calls.

The terminal client can change the scheduling policies through the remote procedure calls even during run time.

Figure 5:
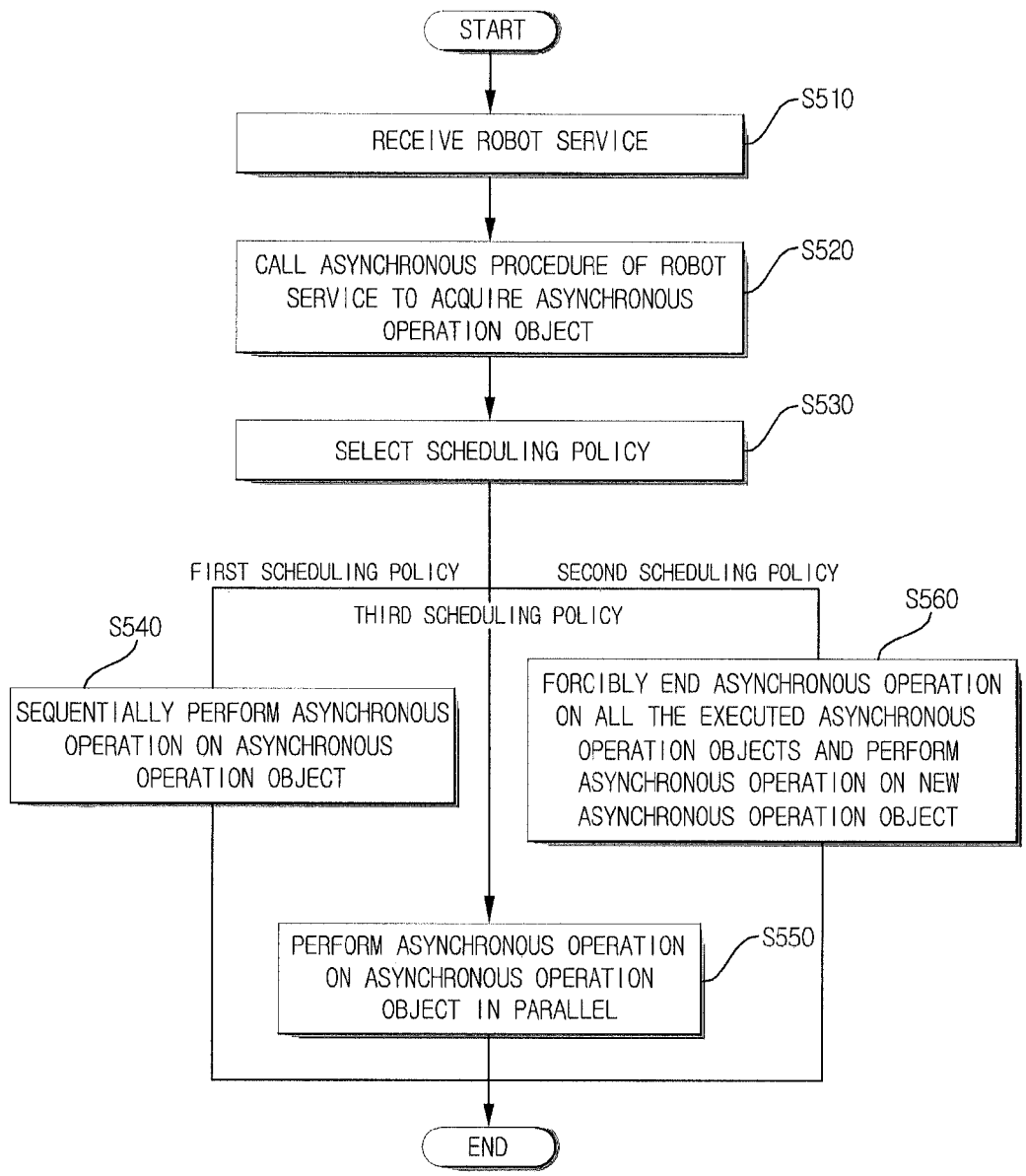
FIG. 5 is a first exemplified diagram showing a method for controlling robot services according to an exemplary embodiment of the present invention.

FIG. 5 is a first exemplified diagram showing a method for controlling robot services according to an exemplary embodiment of the present invention.

As shown in FIG. 5, when the terminal client 122 according to the exemplary embodiment of the present invention receives the plurality of robot services from the service server (S510), it calls the asynchronous procedure of the robot services to acquire the asynchronous operation objects (S520).

The terminal client 122 selects any one of the previously established scheduling policies for performing the asynchronous operations on the asynchronous operation objects (S530) and performs the asynchronous operations for the asynchronous operation objects according to the selected scheduling policies.

Describing this, the terminal client 122 puts the asynchronous operation objects in the queue according to the selection of the first scheduling policy, performs the asynchronous operations on the first entered asynchronous operation objects in the thread pool, and then, sequentially performs the asynchronous operations on the next asynchronous operation objects (S540).

Alternatively, the terminal client 122 immediately puts the asynchronous operation objects in the thread pool according to the selection of the second scheduling policy to perform the asynchronous operations in parallel (S550).

Alternatively, the terminal client 122 ends the asynchronous operation execution for all the existing asynchronous operation objects processed in the thread pool according to the selection of the third scheduling policy and puts the new asynchronous operation objects in the thread pool to perform the asynchronous operations on the asynchronous operation objects (S560).

The operation synthesis function will now be described.

Many services required for the robot is not limited to the case where they are not processed one at a time but may be simultaneously processed. For example, there may be the case where the robot finds out a person during the movement or outputs voice and shakes an arm by controlling a head. In order to process the plurality of robot services, the unit asynchronous operation should be processed in parallel or in sequence according to the situation, which is considerably complicated and inefficient.

Therefore, there is a need for the asynchronous operation synthesis scheme capable of being more simply reused and providing various functions.

Figures 6, 7:
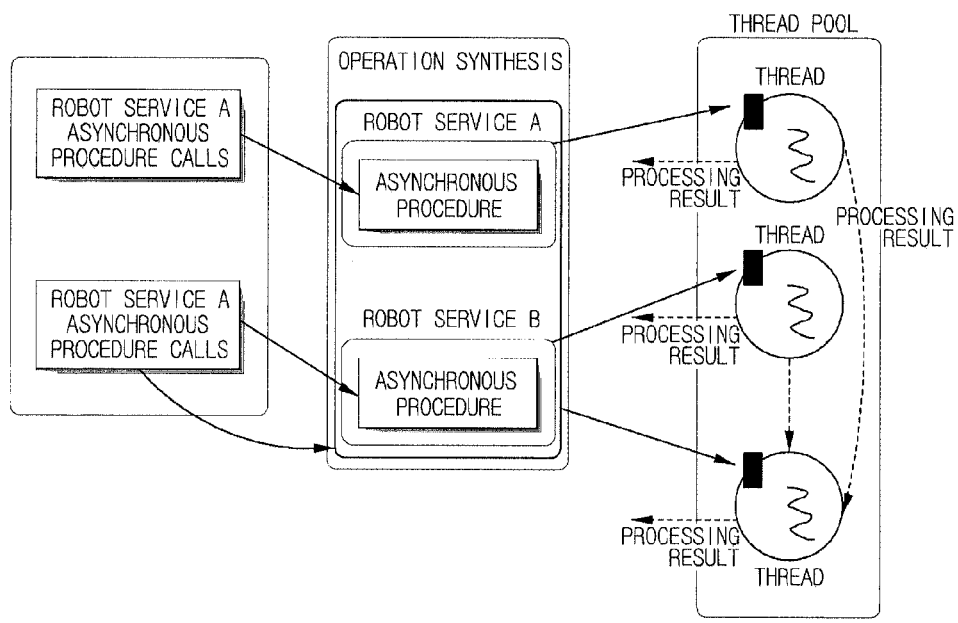
FIG. 6 is an exemplified diagram for explaining an operation principle of an operation synthesis function according to an exemplary embodiment of the present invention.
FIG. 7 is an exemplified diagram showing a program source of an operation synthesis objects according to an exemplary embodiment of the present invention.

FIG. 6 is an exemplified diagram for explaining an operation principle of an operation synthesis function according to an exemplary embodiment of the present invention.

As shown in FIG. 6, the asynchronous operation synthesis function according to the exemplary embodiment of the present invention is implemented in a scheme of grouping at least one asynchronous operation into one asynchronous operation group and processing it. Of course, the scheme of synthesizing and processing an operation may be variously implemented as necessary.

For example, when the terminal client 122 receives the two robot services A, the two asynchronous operation objects are acquired through the two-time asynchronous procedure calls of the robot service A.

The acquired two asynchronous operation control objects is grouped into a single group by using the operation synthesis function and hands several grouped asynchronous operation objects over the single asynchronous operation objects, thereby executing at least one asynchronous operation in sequence or in parallel.

Next, the asynchronous operation objects is informed that the execution ends from each unit asynchronous operation object to acquire the result values, thereby confirming whether the execution ends.

FIG. 7 is an exemplified diagram showing a program source of an operation synthesis object according to an exemplary embodiment of the present invention.

FIG. 7 shows the objects providing the parallel and sequential synthesis function of the asynchronous operations according to the exemplary embodiment of the present invention. Applying the principle, the single asynchronous operations can be executed after a predetermined time or the operation can be executed only during a predetermined time.

Figure 8:
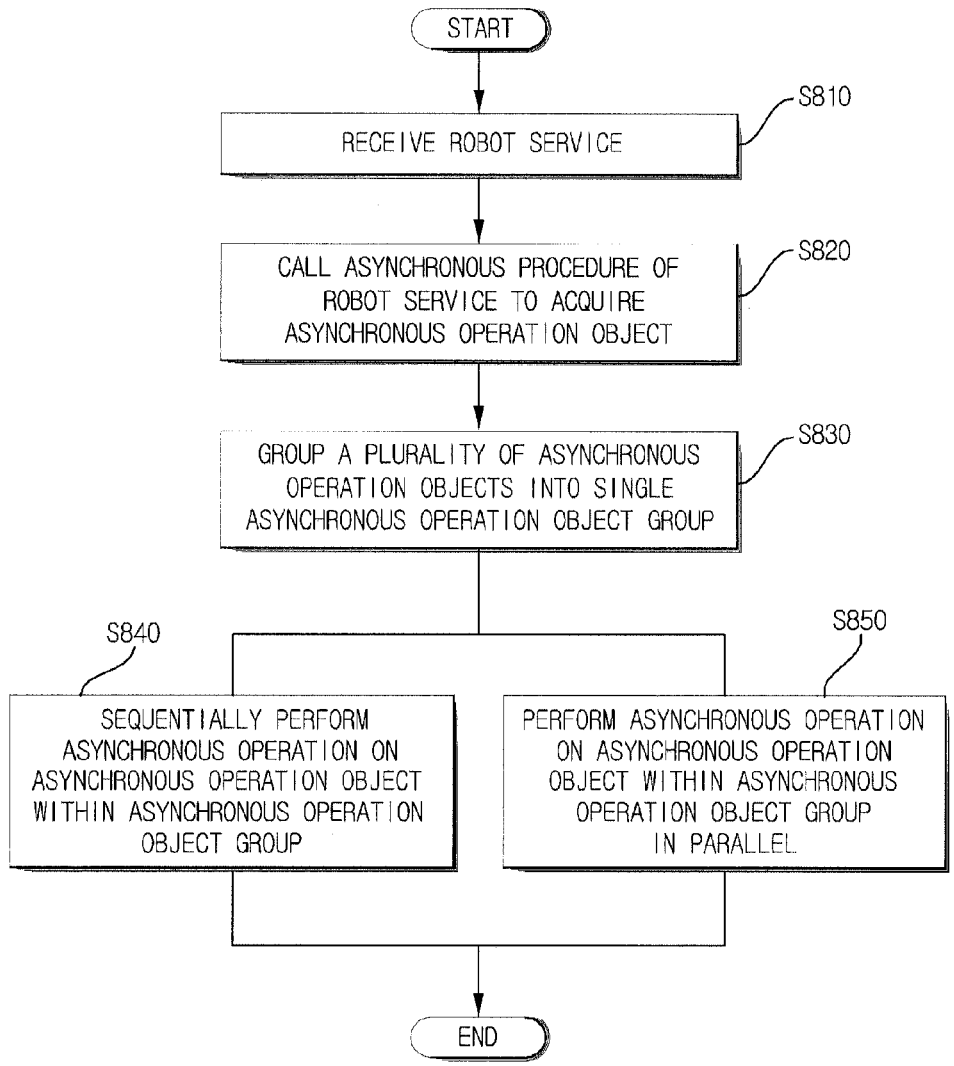
FIG. 8 is a second exemplified diagram showing a method for controlling robot services according to an exemplary embodiment of the present invention.

FIG. 8 is a second exemplified diagram showing a method for controlling robot services according to an exemplary embodiment of the present invention.

As shown in FIG. 8, when the terminal client 122 according to the exemplary embodiment of the present invention receives the plurality of robot services from the service server (S810), it calls the asynchronous procedure of the robot services to acquire the asynchronous operation objects (S820).

The terminal client 122 groups the plurality of acquired asynchronous operation objects into a single asynchronous operation object group by using the operation synthesis function (S830) and processes the asynchronous operations on the plurality of asynchronous operation objects within the single asynchronous operation object group in sequence or in parallel.

Describing this, the terminal client 122 puts the asynchronous operation objects in the queue, performs the asynchronous operations on the asynchronous operation objects within the first entered asynchronous operation object group in the thread pool, and then, sequentially performs the asynchronous operations on the next asynchronous operation objects (S840).

Alternatively, the terminal client 122 immediately puts the asynchronous operation object group in the thread pool to perform the asynchronous operation on the asynchronous operation objects within the asynchronous operation object group in parallel (S850).

As described above, the exemplary embodiment of the present invention previously establishes the plurality of scheduling policies to allow the scheduler to variably apply other scheduling policies according to resources in order to process the requested robot services, thereby avoiding the resource collision due to the resource approach in the plurality of robot services.

Further, the exemplary embodiment of the present invention groups at least one asynchronous operation into single asynchronous operation to perform at least one asynchronous operation in the group in sequence or in parallel, thereby improving the simultaneity of the robot services and execute the operation applications for the high performance control.

The exemplary embodiments of the present invention can be variously changed and modified without departing from the scope of the present invention by those skilled in the art within a technical field to which an apparatus for controlling a service of a network robot system based on remote procedure calls and a method thereof belong. The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. An apparatus for controlling a plurality of robot services of a network robot system, comprising:
    a terminal agent configured to, upon receiving the plurality of robot services from a service server through a network, call an asynchronous procedure of each of the robot services to acquire a plurality of asynchronous operation objects for the robot services, and perform asynchronous operations on the acquired asynchronous operation objects according to one of previously established scheduling policies; and
    a plurality of drivers configured to execute the robot services according to the asynchronous operations of the terminal agent,
    wherein the previously established scheduling policies include a first scheduling policy for sequentially performing the asynchronous operations on the acquired asynchronous operation objects, a second scheduling policy for executing the asynchronous operations on the acquired asynchronous operation objects in parallel, and a third scheduling policy for forcibly ending existing asynchronous operations and performing the asynchronous operations on the acquired asynchronous operation objects.

2. The apparatus of claim 1, wherein the terminal agent is configured to, when executing the asynchronous operations according to the first scheduling policy, put the acquired asynchronous operation objects in a queue, and sequentially perform the asynchronous operations on the queued asynchronous operation objects in one thread.

3. The apparatus of claim 1, wherein the terminal agent is configured to, when executing the asynchronous operations according to the second scheduling policy, put the asynchronous operation objects in a thread pool, and perform the asynchronous operations on the acquired asynchronous operation objects in a plurality of threads in parallel.

4. The apparatus of claim 1, wherein the terminal agent is configured to, when executing the asynchronous operations according to the third scheduling policy, end execution of existing asynchronous operations in a thread pool, and put the acquired asynchronous operation objects in the thread pool to perform the asynchronous operations on the acquired asynchronous operation objects.

5. An apparatus for controlling a plurality of robot services of a network robot system, comprising:
    a terminal agent configured to
        call, upon receiving the plurality of robot services from a service server through a network, an asynchronous procedure of each of the robot services to acquire a plurality of asynchronous operation objects for the robot services,
        group the acquired asynchronous operation objects into a single asynchronous operation object group, and
        select one of a plurality of previously established scheduling policies based on resources available to process the robot services, and perform asynchronous operations on the asynchronous operation objects of the asynchronous operation object group according to the selected scheduling policy; and
    a plurality of drivers configured to execute the robot services according to the asynchronous operations of the terminal agent,
    wherein the plurality of previously established scheduling policies include
        a first scheduling policy for sequentially performing the asynchronous operations on the acquired asynchronous operation objects of the asynchronous operation object group, and
        a second scheduling policy for executing the asynchronous operations on the acquired asynchronous operation objects of the asynchronous operation object group in parallel.

6. The apparatus of claim 5, wherein the sequentially performing the asynchronous operations includes
    putting the acquired asynchronous operation objects in a queue, and
    sequentially performing the asynchronous operations on the queued asynchronous operation objects in one thread.

7. The apparatus of claim 5, wherein the executing the asynchronous operations on the acquired asynchronous operation objects of the asynchronous operation object group in parallel includes
    putting the asynchronous operation objects in a thread pool, and performing the asynchronous operations on the asynchronous operation objects of the asynchronous operation object group in a plurality of threads in parallel.

8. A method for controlling a plurality of robot services of a network robot system, comprising:
   calling an asynchronous procedure of each of the robot services to acquire a plurality of asynchronous operation objects for the robot services, upon receiving the plurality of robot services from a service server through a network;
   executing asynchronous operations on the acquired asynchronous operation objects according to one of previously established scheduling policies; and
   executing the robot services through a plurality of drivers according to the asynchronous operations,
   wherein the previously established scheduling policies include a first scheduling policy for sequentially performing the asynchronous operations on the acquired asynchronous operation objects, a second scheduling policy for executing the asynchronous operations on the acquired asynchronous operation objects in parallel, and a third scheduling policy for forcibly ending existing asynchronous operations and performing the asynchronous operations on the acquired asynchronous operation objects.

9. The method of claim 8, wherein the executing the asynchronous operation includes, when according to the first scheduling policy, putting the asynchronous operation objects in a queue, and sequentially performing the asynchronous operations on the queued asynchronous operation objects in one threads.

10. The method of claim 8, wherein the executing the asynchronous operation includes, when according to the second scheduling policy, putting the asynchronous operation objects in a thread pool, and performing the asynchronous operations on the acquired asynchronous operation objects in a plurality of threads in parallel.

11. The method of claim 8, wherein the executing the asynchronous operation includes, when according to the third scheduling policy, ending execution of existing asynchronous operations in a thread pool, and putting the acquired asynchronous operation objects in the thread pool to perform the asynchronous operations on the acquired asynchronous operation objects.

12. A method for controlling a plurality of robot services of a network robot system, comprising:
   calling an asynchronous procedure of each of the robot services to acquire a plurality of asynchronous operation objects for the robot services, upon receiving the plurality of robot services from a service server through a network;
   grouping the acquired asynchronous operation objects into a single asynchronous operation object group;
   selecting one of a plurality of previously established scheduling policies based on resources available to process the robot services, and performing asynchronous operations on the acquired asynchronous operation objects of the asynchronous operation object group according to the selected scheduling policy; and
   executing the robot services according to the asynchronous operations through a plurality of drivers,
   wherein the plurality of previously established scheduling policies include
      a first scheduling policy for sequentially performing the asynchronous operations on the acquired asynchronous operation objects of the asynchronous operation object group, and
      a second scheduling policy for executing the asynchronous operations on the acquired asynchronous operation objects of the asynchronous operation object group in parallel.

13. The method of claim 12, wherein the sequentially performing the asynchronous operations includes
   putting the acquired asynchronous operation objects in a queue, and
   sequentially performing the asynchronous operations on the queued asynchronous operation objects in one thread.

14. The method of claim 12, wherein the executing the asynchronous operations on the acquired asynchronous operation objects of the asynchronous operation object group in parallel includes
   putting the asynchronous operation objects in a thread pool, and
   performing the asynchronous operations on the asynchronous operation objects of the asynchronous operation object group in a plurality of threads in parallel.

* * * * *